(12) United States Patent
Wang et al.

(10) Patent No.: US 8,862,867 B2
(45) Date of Patent: Oct. 14, 2014

(54) METHOD AND SYSTEM FOR PROTECTING SECURITY OF THE THIRD LAYER MOBILITY USER PLANE DATA IN NGN

(75) Inventors: Hongyan Wang, Shenzhen (CN); Yinxing Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 27 days.

(21) Appl. No.: 13/257,955

(22) PCT Filed: Mar. 22, 2010

(86) PCT No.: PCT/CN2010/071189
§ 371 (c)(1),
(2), (4) Date: Jul. 12, 2012

(87) PCT Pub. No.: WO2011/085565
PCT Pub. Date: Jul. 21, 2011

(65) Prior Publication Data
US 2012/0272054 A1    Oct. 25, 2012

(30) Foreign Application Priority Data
Jan. 15, 2010    (CN) .......................... 2010 1 0001242

(51) Int. Cl.
*H04L 29/06*    (2006.01)
(Continued)

(52) U.S. Cl.
CPC ..................................... *H04L 63/08* (2013.01);
(Continued)

(58) Field of Classification Search
USPC .......................................................... 713/151
See application file for complete search history.

(56) References Cited

U.S. PATENT DOCUMENTS

| 2006/0043901 | A1 | 3/2006 | Ito et al. |
| 2009/0043901 | A1* | 2/2009 | Mizikovsky et al. ......... 709/229 |

(Continued)

FOREIGN PATENT DOCUMENTS

| CN | 1688171 A | 10/2005 |
| CN | 101056456 A | 10/2007 |

(Continued)

OTHER PUBLICATIONS

Huaxin Zeng; Yu Gao; Yu Xia, "On NGN architecture and evolution strategy," Innovations in NGN: Future Network and Services, 2008. K-INGN 2008. First ITU-T Kaleidoscope Academic Conference , vol., no., pp. 337,342, May 12-13, 2008.*

(Continued)

*Primary Examiner* — Evans Desrosiers
*Assistant Examiner* — Vu V Tran
(74) *Attorney, Agent, or Firm* — Oppedahl Patent Law Firm LLC

(57) ABSTRACT

The disclosure discloses a method for protecting security of layer-3 mobility user plane data in Next Generation Network (NGN), includes: performing authentication by a terminal with an authentication server; after the authentication is passed, obtaining a shared key material by both the terminal and the authentication server; generating, by the terminal and the authentication server, a mobility data security key according to the shared key material; transmitting, by the authentication server, the generated mobility data security key to a mobility data transmission module; protecting security of the layer-3 mobility user plane data, by the terminal and the mobility data transmission module, by using the mobility data security key. The disclosure also discloses a system for protecting security of layer-3 mobility user plane data in NGN. By using the method and the system provided by the disclosure, the protection for security of user plane data between the NGN user and the NGN network side is realized, and the security of user plane data of the terminal in layer-3 mobility session is enhanced.

2 Claims, 5 Drawing Sheets

(51) Int. Cl.
*H04W 12/06* (2009.01)
*H04L 9/00* (2006.01)
*H04L 9/08* (2006.01)
*H04W 12/04* (2009.01)
*H04W 80/04* (2009.01)

(52) U.S. Cl.
CPC ........ *H04L 2463/061* (2013.01); *H04L 63/164* (2013.01); *H04W 12/06* (2013.01); *H04L 63/06* (2013.01); *H04W 12/04* (2013.01); *H04W 80/04* (2013.01)
USPC ........... 713/151; 380/277; 380/278; 380/279; 380/280; 380/281; 380/282; 380/283; 380/284; 380/285; 380/286; 380/44; 380/45; 380/46; 380/47

(56) References Cited

U.S. PATENT DOCUMENTS

| | | | | |
|---|---|---|---|---|
| 2011/0078442 | A1* | 3/2011 | Gong et al. | 713/168 |
| 2011/0173689 | A1* | 7/2011 | Kim et al. | 726/8 |

FOREIGN PATENT DOCUMENTS

| | | |
|---|---|---|
| CN | 101110672 A | 1/2008 |
| CN | 101304407 A | 11/2008 |
| JP | 2005064984 A | 3/2005 |

OTHER PUBLICATIONS

Kawashima, M.; Mizuno, S.; Kato, J., "Architecture for broadband and mobile VPN over NGN," Innovations in NGN: Future Network and Services, 2008. K-INGN 2008. First ITU-T Kaleidoscope Academic Conference, vol., no., pp. 187,194, May 12-13, 2008.*

International Search Report in international application No. PCT/CN20101071189, mailed on Oct. 28, 2010.

English Translation of the Written Opinion of the International Search Authority in international application No. PCT/CN2010/071189, mailed on Oct. 28, 2010.

Proposal for security between UE and L3HEF in Y. mobsec Jan. 11, 2010.

Draft new Recommendation Y.mobSec, "Mobility Security Framework in NGN" Sep. 25, 2009.

Supplementary European Search Report in European application number: 10842849.1, mailed on Feb. 27, 2014.

* cited by examiner

METHOD AND SYSTEM FOR PROTECTING SECURITY OF THE THIRD LAYER MOBILITY USER PLANE DATA IN NGN

TECHNICAL FIELD

The disclosure relates to layer-3 mobility session security technology in the field of communications, and in particular to a method and a system for protecting security of layer-3 mobility user plane data in Next Generation Network (NGN).

BACKGROUND

The NGN, as an evolved network framework which is based on packet switching, is given more and more attentions. Extensive studies and standardization work have been done concerning NGN framework model, service and relevant field by International Telegraph Union (ITU-T) and other regional standards organizations, such as European Telecommunications Standards Institute (ETSI), the Alliance For Telecommunications Industry Solutions (ATIS) and so on. The NGN can support heterogeneous network access, inter-network roaming and seamless handover. When handover is performed by a mobile user terminal, the continuity of service needs to be guaranteed, meanwhile, the privacy and the completeness of signaling plane data and user plane data between the mobile user terminal and NGN network access point should be guaranteed.

After authentication of a NGN user is passed, a sub-key material is generated through negotiation by using a shared key owned by both the user and NGN network side, for protecting the security of communication between the user and the NGN network. In the present NGN network, there is a scheme for protecting signaling plane security, that is: the user and the NGN network side generate a mobility security sub-key used for protecting the security of the mobility signaling plane by using the shared key obtained after the authentication is passed, when the NGN network side receives a mobility signaling initialized by a NGN user, validates legality of the mobility signaling by using the same mobility security sub-key generated by the NGN user and the networks side so as to protect the mobility signaling; likewise, when the NGN user receives a mobility signaling initialized by the NGN network side, also validates legality of the mobility signaling by using the same mobility security sub-key generated by the NGN user and the networks side so as to protect the mobility signaling.

However, in the present NGN mobility security solutions, there is no technical scheme for protecting the security of user plane data between the NGN user and the NGN network side; thus, it is inconvenient in practical application.

SUMMARY

In view of the problems above, the main object of the disclosure is to provide a method and a system for protecting security of layer-3 mobility user plane data in NGN, so as to realize the protection for security of user plane data between the NGN user and the NGN network side.

In order to realize the purpose above, the technical scheme of the disclosure is realized by the followings.

The disclosure provides a method for protecting security of layer-3 mobility user plane data in Next Generation Network (NGN), which includes:

performing authentication by a terminal with an authentication server; obtaining a shared key material by both the terminal and the authentication server after the authentication is passed;

generating, by the terminal and the authentication server, a mobility data security key according to the shared key material;

transmitting, by the authentication server, generated mobility data security key to a mobility data transmission module;

protecting security of the layer-3 mobility user plane data by the terminal and the mobility data transmission module by using the mobility data security key.

Before generating a mobility data security key according to the shared key material, the method may further include:

interacting by the terminal with the authentication server, to obtain layer-3 mobility information.

Generating a mobility data security key according to the shared key material may specifically include:

calculating to generate the mobility data security key by the terminal and the authentication server directly according to obtained layer-3 mobility information and the shared key material by using the same security algorithm.

Generating a mobility data security key according to the shared key material may specifically include:

calculating to generate a sub-key of the shared key material by the terminal and the authentication server according to the shared key material by using the same security algorithm; and calculating to generate the mobility data security key according to the layer-3 mobility information and the sub-key of the shared key material by using the same security algorithm.

Generating a mobility data security key according to the shared key material may specifically include:

calculating to generate a mobility signaling security key by the terminal and the authentication server according to obtained layer-3 mobility information and shared key material by using the same security algorithm; and calculating to generate the mobility data security key according to the layer-3 mobility information and the mobility signaling security key by using the same security algorithm.

Protecting security of the layer-3 mobility user plane data by the terminal and the mobility data transmission module by using the mobility data security key may specifically include:

validating, by the mobility data transmission module, legality of received mobility user plane data according to the mobility data security key when the mobility data transmission module receives the mobility user plane data sent by the terminal;

validating, by the terminal, legality of received mobility user plane data according to the mobility data security key when the terminal receives the mobility user plane data sent by the mobility data transmission module.

The disclosure further provides a system for protecting security of layer-3 mobility user plane data in Next Generation Network (NGN), includes: a terminal, an authentication server and a mobility data transmission module, wherein the terminal is configured to perform authentication to the authentication server and obtain a shared key material after the authentication is passed; further configured to generate a mobility data security key according to the shared key material and protect security of the layer-3 mobility user plane data between the terminal and the mobility data transmission module by using the mobility data security key;

the authentication server is configured to perform authentication to the terminal and obtain a shared key material after the authentication is passed; further configured to generate a mobility data security key according to the shared key material and transmit generated mobility data security key to the mobility data transmission module;

the mobility data transmission module is configured to protect security of the layer-3 mobility user plane data between the terminal and the mobility data transmission module by using the received mobility data security key.

The terminal and the authentication server may be further configured to interact with each other to obtain layer-3 mobility information before generating the mobility data security key according to the shared key material.

The terminal and the authentication server may be further configured to directly calculate to generate the mobility data security key according to obtained layer-3 mobility information and shared key material by using the same security algorithm.

The terminal and the authentication server may be further configured to calculate to generate a sub-key of the shared key material according to the shared key material by using the same security algorithm, and calculate to generate the mobility data security key according to the layer-3 mobility information and the sub-key of the shared key material by using the same security algorithm.

The terminal and the authentication server may be further configured to calculate to generate a mobility signaling security key according to obtained layer-3 mobility information and shared key material by using the same security algorithm, and calculate to generate the mobility data security key according to the layer-3 mobility information and the mobility signaling security key by using the same security algorithm.

The terminal may be further configured to validate legality of received mobility user plane data according to the mobility data security key when the terminal receives the mobility user plane data sent by the mobility data transmission module;

correspondingly, the mobility data transmission module may be further configured to validate legality of received mobility user plane data according to the mobility data security key when the mobility data transmission module receives the mobility user plane data sent by the terminal.

In the method and system provided by the disclosure for protecting security of layer-3 mobility user plane data in NGN, the terminal and the authentication server generate a mobility data security key according to the shared key material obtained through authentication, and protect security of layer-3 mobility user plane data through generated mobility data security key. The method of the disclosure realizes the protection for security of user plane data between the NGN user and the NGN network side, and enhances the security of user plane data of the terminal in layer-3 mobility session.

DETAILED DESCRIPTION

The technical scheme of the disclosure is further illustrated below in conjunction with accompanying drawings and specific embodiments.

Figure 1:
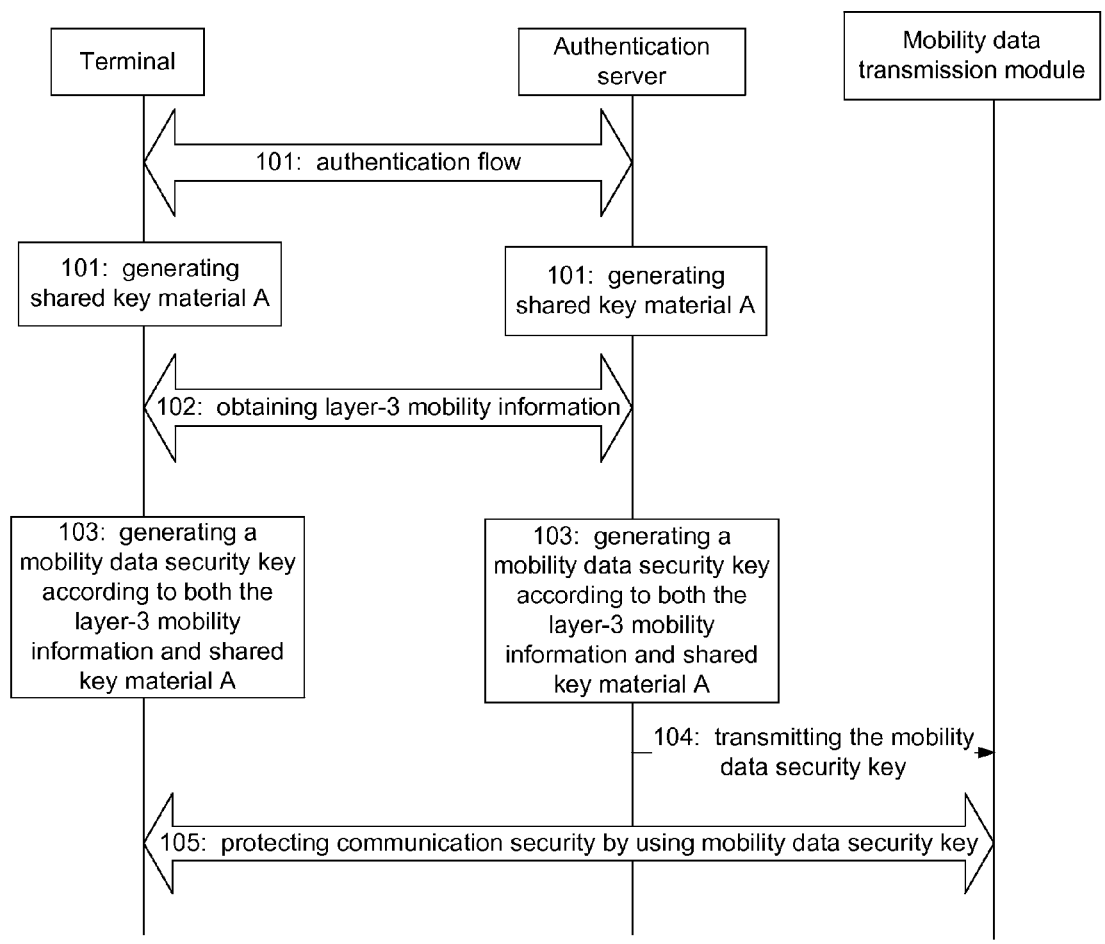
FIG. 1 shows a flowchart of a method for protecting security of layer-3 mobility user plane data in NGN according to the first embodiment of the disclosure.

In order to realize the protection for security of user plane data between the NGN user and the NGN network side, the first embodiment of the disclosure provides a method for protecting security of layer-3 mobility user plane data in NGN, as shown in FIG. 1, the method mainly includes the following steps that:

step 101: an authentication flow is performed between a terminal and an authentication server; after the authentication is passed, both the terminal and the authentication server obtain a shared key material, which is indicated as shared key material A;

step 102: the terminal interacts with the authentication server to obtain layer-3 mobility information;

during the interaction between the terminal and the authentication server, the terminal obtains layer-3 mobility information from network side, wherein the layer-3 mobility information includes: address of destination network, type of destination network and the like;

step 103: the terminal and the authentication server generate a mobility data security key for protecting security of layer-3 mobility user plane data according to the layer-3 mobility information and shared key material A;

the terminal and the authentication server may directly calculate to generate a mobility data security key according to the layer-3 mobility information and the shared key material by using the same security algorithm; in this way, the mobility data security key calculated and generated by the terminal is the same as the mobility data security key calculated and generated by the authentication server; applicable security algorithm includes: HMAC-SHA1, Keyed-MD5, etc.;

step 104: the authentication server transmits the mobility data security key to a mobility data transmission module;

step 105: the terminal and the mobility data transmission module protect security of data transmission by using the mobility data security key;

specifically, the mobility data transmission module validates legality of received mobility user plane data by using the mobility data security key when the mobility data transmission module receives the mobility user plane data sent by the terminal; the terminal validates the legality of received mobility user plane data by using the mobility data security key when the terminal receives the mobility user plane data sent by the mobility data transmission module.

It should be noted that: the terminal and the authentication server in the disclosure may also only generate a mobility data security key according to the shared key material obtained in the authentication flow (without using layer-3 mobility information); that is, layer-3 mobility information is not a mandatory parameter for the terminal and the authentication server to generate a mobility data security key.

Figure 2:
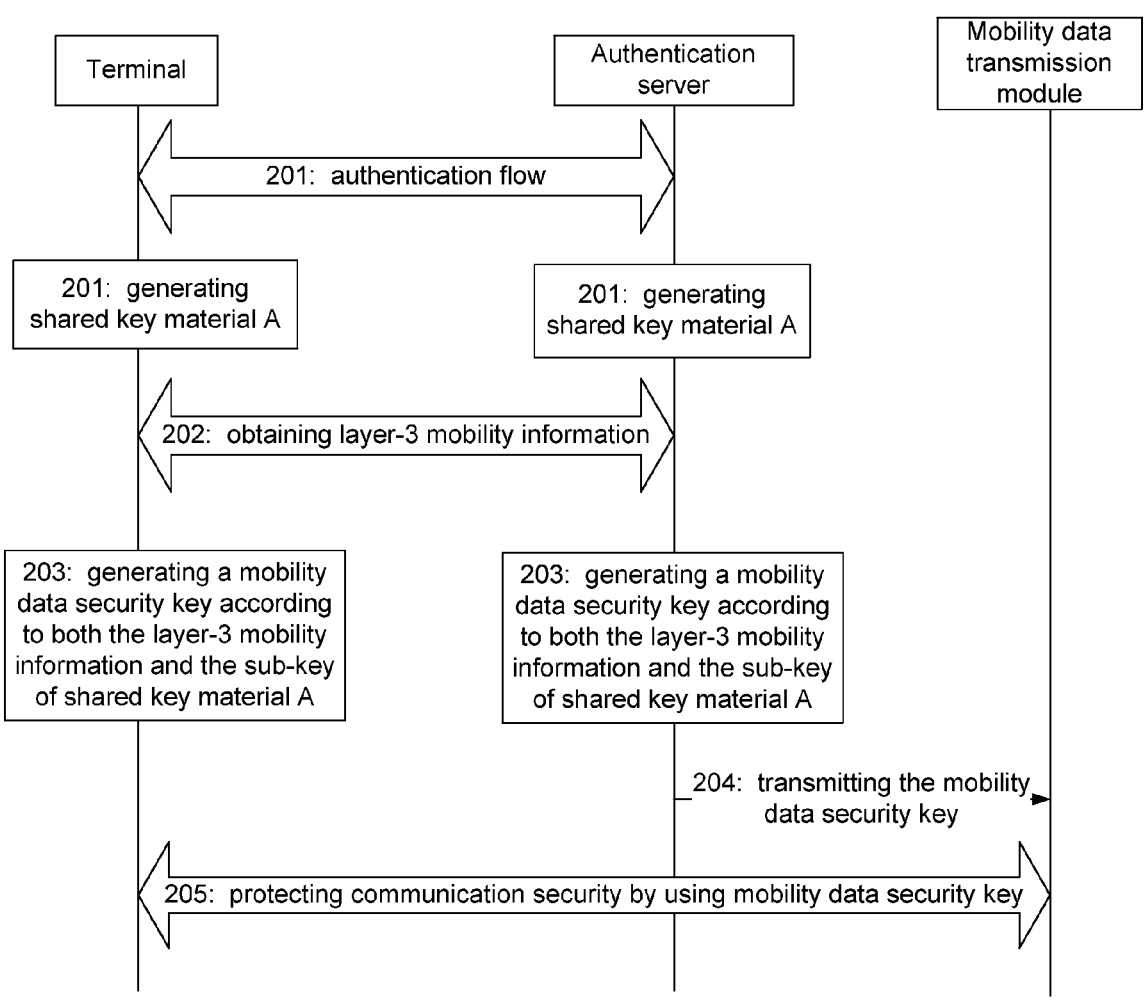
FIG. 2 shows a flowchart of a method for protecting security of layer-3 mobility user plane data in NGN according to the second embodiment of the disclosure.
Figure 3:
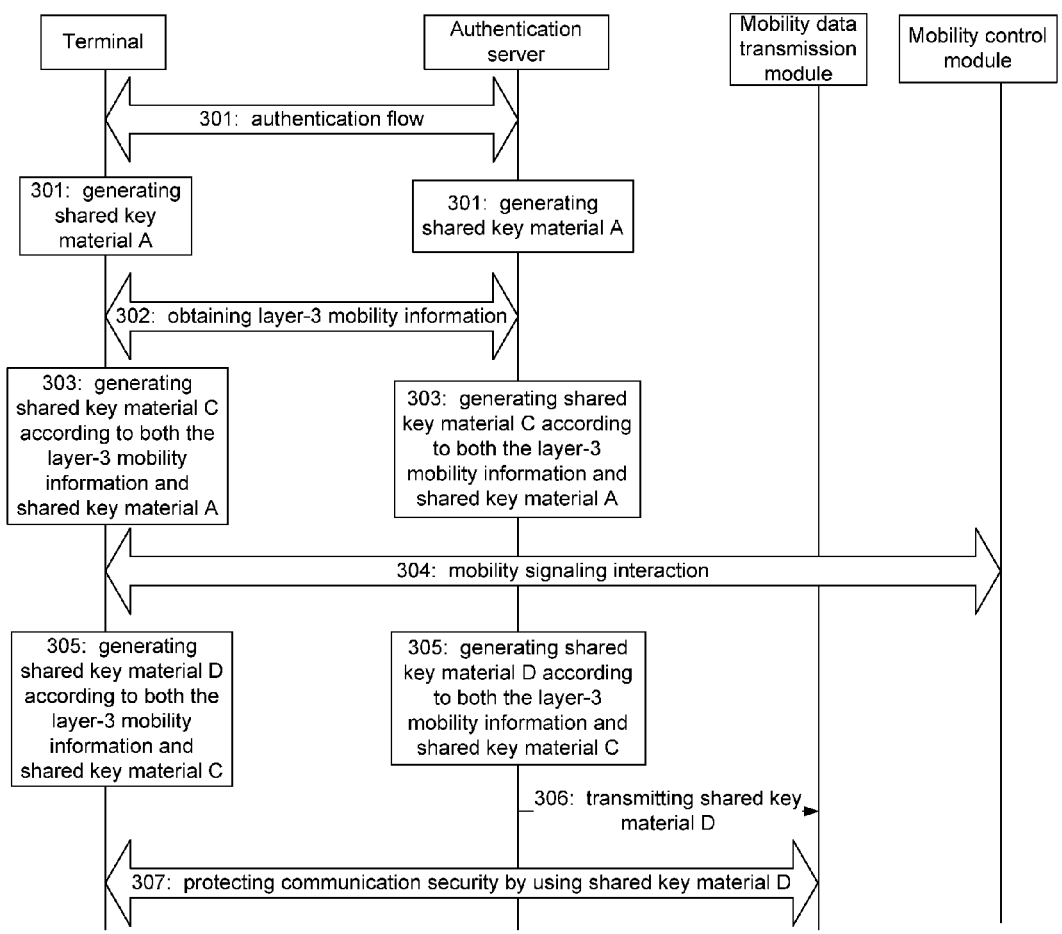
FIG. 3 shows a flowchart of a method for protecting security of layer-3 mobility user plane data in NGN according to the third embodiment of the disclosure.

In the disclosure, the method that the terminal and the authentication server generate a mobility data security key according to the layer-3 mobility information and the shared key material is not limited to what shown in FIG. 1; other methods can also be adopted, as shown in FIG. 2 and FIG. 3, the methods are introduced below respectively.

The method for protecting security of layer-3 mobility user plane data in NGN according to the second embodiment of the disclosure is as shown in FIG. 2, which mainly includes the following steps:

step 201: an authentication flow is performed between a terminal and an authentication server; after the authentication is passed, both the terminal and the authentication server obtain a shared key material, which is indicated as shared key material A;

step 202: the terminal interacts with the authentication server to obtain layer-3 mobility information;

step 203: the terminal and the authentication server calculate to generate a sub-key of shared key material A according to shared key material A by using the same security algorithm, and then calculate to generate a mobility data security key according to the layer-3 mobility information and the sub-key by using the same security algorithm;

specifically, the security algorithm for calculating and generating the sub-key might be the same as or different from the security algorithm for calculating and generating the mobility data security key;

Step 204: the authentication server transmits the mobility data security key to a mobility data transmission module;

step 205: the terminal and the mobility data transmission module protect security of data transmission by using the mobility data security key.

The method for protecting security of layer-3 mobility user plane data in NGN according to the third embodiment of the disclosure is as shown in FIG. 3, which mainly includes the following steps:

step 301: an authentication flow is performed between a terminal and an authentication server; after the authentication is passed, both the terminal and the authentication server obtain a shared key material, which is indicated as shared key material A;

step 302: the terminal interacts with the authentication server to obtain layer-3 mobility information;

step 303: the terminal and the authentication server calculate to generate a sub-key of shared key material A according to shared key material A by using the same security algorithm, and then calculate to generate a mobility signaling security key, which is indicated as shared key material C, according to the layer-3 mobility information and the sub-key by using the same security algorithm;

specifically, the security algorithm for calculating and generating the sub-key might be the same as or different from the security algorithm for calculating and generating shared key material C; the authentication server transmits generated shared key material C to a mobility control module;

step 304: the terminal interacts the mobility signaling with the mobility control module, and the security of the mobility signaling is protected by using shared key material C;

specifically, the mobility control module validates the legality of a received mobility signaling by using shared key material C when the mobility control module receives the mobility signaling initiated by the terminal; the terminal validates the legality of a received mobility signaling by using shared key material C when the terminal receives the mobility signaling initiated by the mobility control module;

step 305: the terminal and the authentication server calculate to generate a mobility data security key, which is indicated as shared key material D, according to the layer-3 mobility information and shared key material C by using the same security algorithm;

the security algorithm for calculating and generating shared key material D might be the same as or different from the security algorithm for calculating and generating the sub-key and the security algorithm for calculating and generating shared key material C;

step 306: the authentication server transmits shared key material D to a mobility data transmission module;

step 307: the terminal and the mobility data transmission module protect security of data transmission by using shared key material D;

specifically, the mobility data transmission module validates the legality of received mobility user plane data by using shared key material D when the mobility data transmission module receives the mobility user plane data sent by the terminal; the terminal validates the legality of received mobility user plane data by using shared key material D when the terminal receives the mobility user plane data sent by the mobility data transmission module.

In order to realize the above methods for protecting security of layer-3 mobility user plane data in NGN, the disclosure further provides a system for protecting security of layer-3 mobility user plane data in NGN, includes: a terminal, an authentication server and a mobility data transmission module.

The terminal is configured to perform authentication to the authentication server and obtain a shared key material after the authentication is passed, further configured to generate a mobility data security key according to the shared key material and protect security of the layer-3 mobility user plane data between the terminal and the mobility data transmission module by using the mobility data security key.

The authentication server is configured to perform authentication to the terminal and obtain a shared key material after the authentication is passed, further configured to generate a mobility data security key according to the shared key material and transmit the generated mobility data security key to the mobility data transmission module.

The mobility data transmission module is configured to protect security of the layer-3 mobility user plane data between the terminal and the mobility data transmission module by using the received mobility data security key.

When the method for protecting security of layer-3 mobility user plane data in NGN is applied in the NGN of ITU-T, the specific implementation flows are as shown in FIG. 4, FIG. 5, FIG. 6 and FIG. 7.

Figure 4:
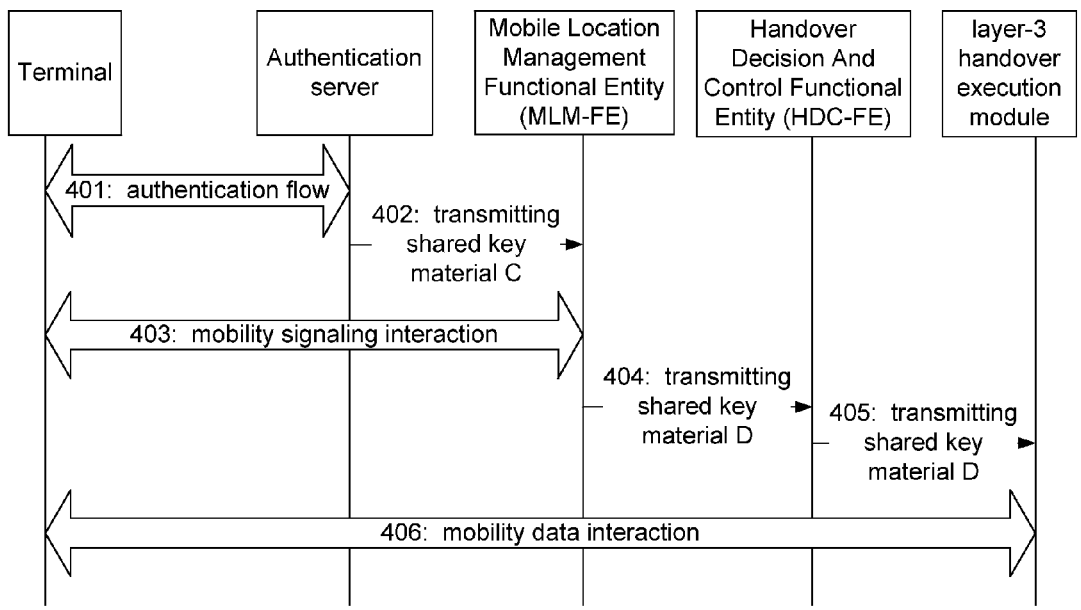
FIG. 4 shows a flowchart of a method for protecting security of layer-3 mobility user plane data in NGN according to the fourth embodiment of the disclosure.

FIG. 4 shows a flowchart of a method for protecting security of layer-3 mobility user plane data in NGN according to the fourth embodiment of the disclosure, wherein the method mainly includes the following steps:

step 401: an authentication flow is performed between a terminal and an authentication server; after the authentication is passed, both the terminal and the authentication server obtain a shared key material, which is indicated as shared key material A;

step 402: the terminal interacts with the authentication server, a Mobile Location Management Functional Entity (MLM-FE) and a Handover Decision And Control Functional Entity (HDC-FE) to obtain layer-3 mobility information; the terminal and the authentication server calculate to generate shared key material C for protecting security of layer-3 mobility signaling plane according to the layer-3 mobility information and shared key material A by using the same security algorithm, and the authentication server transmits generated shared key material C to the MLM-FE;

during interacting with the authentication server, the MLM-FE and the HDC-FE, the terminal obtains layer-3 mobility information from network side, wherein the layer-3 mobility information includes: address of destination network, type of destination network and the like;

the MLM-FE includes but not limited to the following functions: replacing the terminal to start location registration and replacing the terminal to process location registration information in the condition of network mobility; managing the binding relationship between the terminal and a terminal address; managing the binding relationship between the terminal and an underlying tunnel termination point; processing signaling forwarding, displaying distribution of new location binding information of the HDC-FE;

the HDC-FE includes but not limited to the following functions: receiving information of different medium networks, triggering terminal to perform handover operation (including layer-2 handover and layer-3 handover);

step 403: the terminal interacts the mobility signaling with the MLM-FE, and the security of the mobility signaling is protected by shared key material C;

step 404: the terminal and the MLM-FE calculate to generate shared key material D for protecting security of layer-3 mobility user plane according to the layer-3 mobility information and shared key material A by using the same security algorithm, and the MLM-FE transmits generated shared key material D to the HDC-FE;

specifically, the security algorithm for calculating and generating shared key material D might be the same as or different from the security algorithm for calculating and generating shared key material C; any one of methods shown in FIG. 1, FIG. 2 and FIG. 3 can be adopted to generate shared key material D;

step 405: the HDC-FE forwards received shared key material D to the layer-3 handover execution module;

step 406: the terminal and the layer-3 handover execution module protect transmission security of layer-3 mobility user plane data by using shared key material D.

Figure 5:
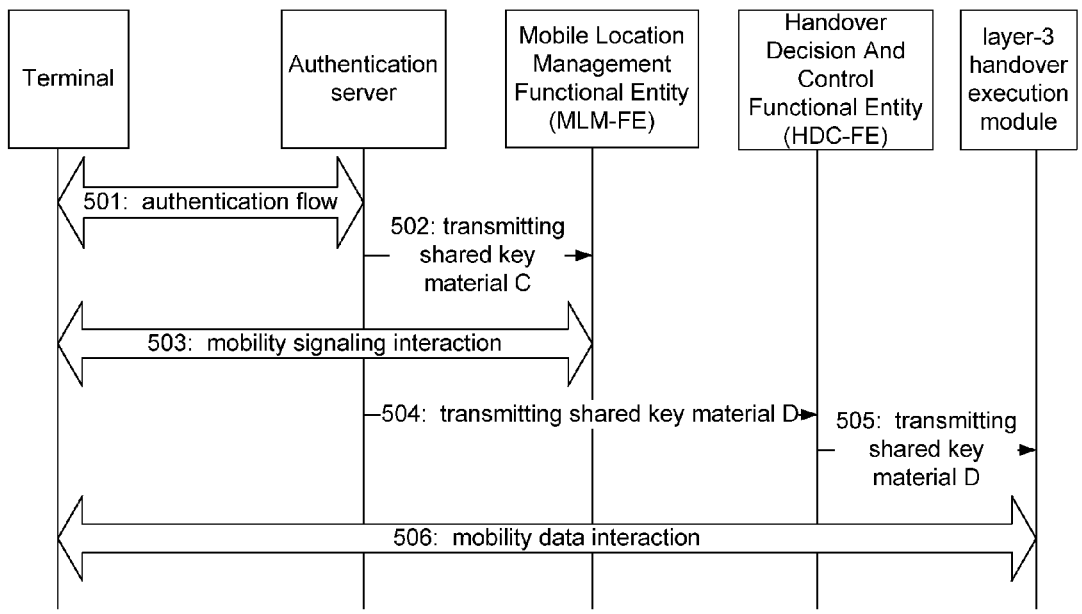
FIG. 5 shows a flowchart of a method for protecting security of layer-3 mobility user plane data in NGN according to the fifth embodiment of the disclosure.

FIG. 5 shows a flowchart of a method for protecting security of layer-3 mobility user plane data in NGN according to the fifth embodiment of the disclosure, wherein the method mainly includes the following steps.

In the flowchart, the operations from step 501 to step 503 are similar to the operations from step 401 to step 403 in the fifth embodiment, thus no further description is needed here.

Step 504: the terminal and the authentication server calculate to generate shared key material D for protecting security of layer-3 mobility user plane according to the layer-3 mobility information and shared key material A by using the same security algorithm, and the authentication server transmits generated shared key material D to the HDC-FE;

specifically, the security algorithm for calculating and generating shared key material D might be the same as or different from the security algorithm for calculating and generating shared key material C; any one of methods shown in FIG. 1, FIG. 2 and FIG. 3 can be adopted to generate shared key material D;

step 505: the HDC-FE forwards received shared key material D to the layer-3 handover execution module;

step 506: the terminal and the layer-3 handover execution module protect transmission security of layer-3 mobility user plane data by using shared key material D.

Figure 6:
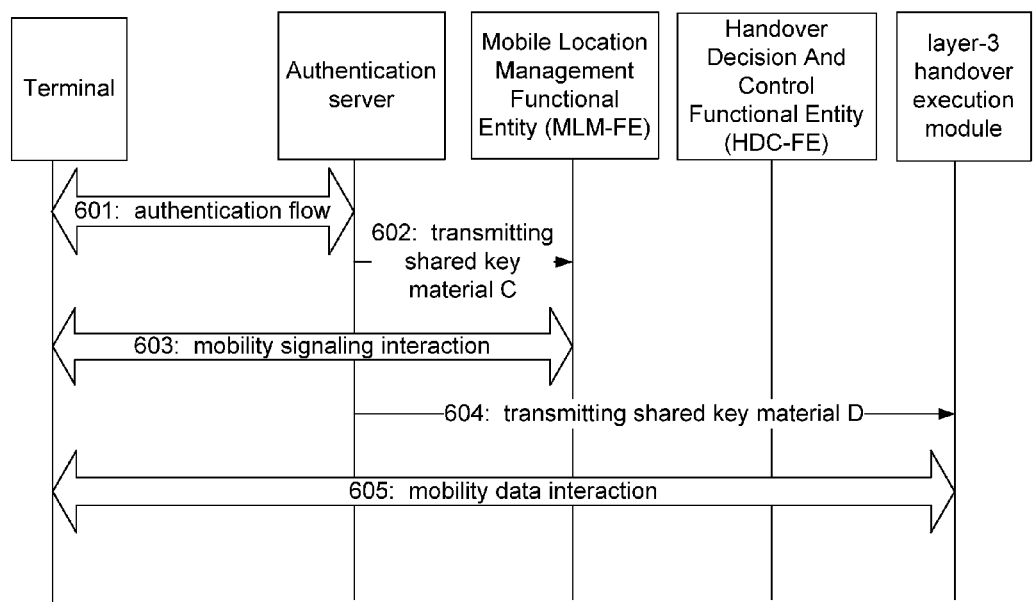
FIG. 6 shows a flowchart of a method for protecting security of layer-3 mobility user plane data in NGN according to the sixth embodiment of the disclosure.

FIG. 6 shows a flowchart of a method for protecting security of layer-3 mobility user plane data in NGN according to the sixth embodiment of the disclosure, wherein the method mainly includes the following steps.

In the flowchart, the operations from step 601 to step 603 are similar to the operations from step 401 to step 403 in the fifth embodiment, thus no further description is needed here.

Step 604: the terminal and the authentication server generate shared key material D for protecting security of layer-3 mobility user plane according to the layer-3 mobility information and shared key material A, and the authentication server directly transmits generated shared key material D to the layer-3 handover execution module;

specifically, the security algorithm for calculating and generating shared key material D might be the same as or different from the security algorithm for calculating and generating shared key material C; any one of methods shown in FIG. 1, FIG. 2 and FIG. 3 can be adopted to generate shared key material D;

step 605: the terminal and the layer-3 handover execution module protect transmission security of layer-3 mobility user plane data by using shared key material D.

Figure 7:
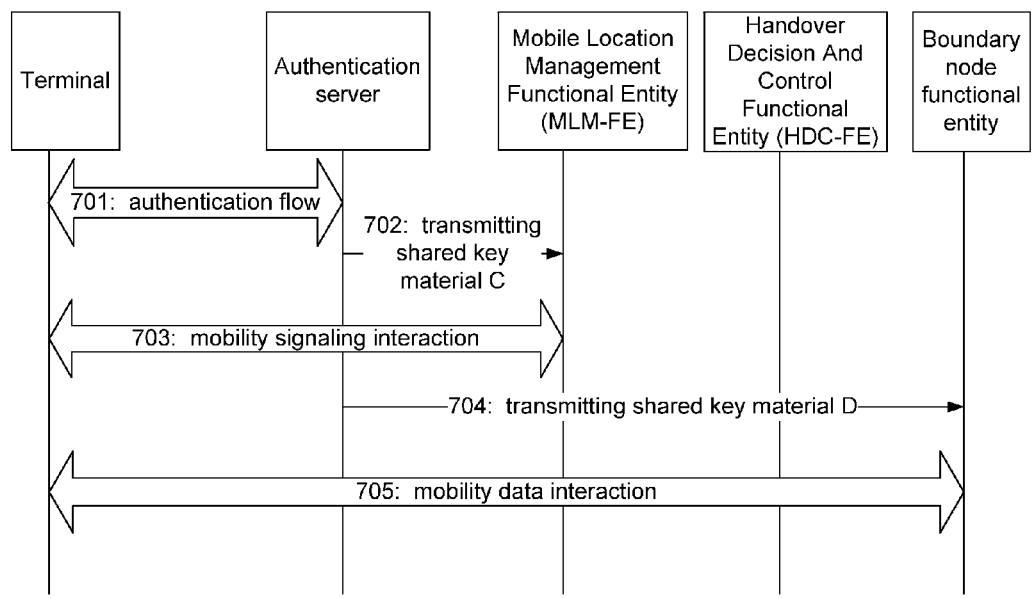
FIG. 7 shows a flowchart of a method for protecting security of layer-3 mobility user plane data in NGN according to the seventh embodiment of the disclosure.

Further, in practical application, the layer-3 handover execution module can be set in a boundary node functional entity; in this condition, the boundary node functional entity replaces the layer-3 handover execution module to execute the functions referred in FIG. 4, FIG. 5 and FIG. 6, and the operation flows keeps unchanged. The embodiment shown in FIG. 7 illustrates a replacement flow of the boundary node functional entity replacing the layer-3 handover execution module to execute the embodiment as shown in FIG. 6, and regarding to the replacement flows of the embodiment shown in FIG. 4 and FIG. 5, no further description is needed here.

To sum up, by using the method and the system for protecting security of layer-3 mobility user plane data in NGN provided by the disclosure, the protection for security of user plane data between the NGN user and the NGN network side is realized, and the security of user plane data of the terminal in layer-3 mobility session is enhanced.

The above are only preferred embodiments of the disclosure and are not intended to limit the protection scope of the disclosure.

The invention claimed is:

1. A method for protecting security of layer-3 mobility user plane data in Next Generation Network (NGN), comprising:
performing authentication by a terminal with an authentication server; obtaining shared key material A by both the terminal and the authentication server after the authentication is passed;
interacting by the terminal with the authentication server, a Mobile Location Management Functional Entity (MLM-FE) and a Handover Decision and Control Functional Entity (HDC-FE) to obtain layer-3 mobility information, wherein the layer-3 mobility information includes: address of destination network and type of destination network;
generating, by the terminal and the authentication server, shared key material C for protecting security of layer-3 mobility signaling plane according to the layer-3 mobility information and shared key material A;
transmitting, by the authentication server, generated shared key material C to the MLM-FE;
interacting by the terminal a mobility signaling with the MLM-FE, wherein the security of the mobility signaling is protected by shared key material C;
generating, by the terminal and the MLM-FE, shared key material D for protecting security of layer-3 mobility user plane according to the layer-3 mobility information and shared key material A;
transmitting, by the MLM-FE, generated shared key material D to the HDC-FE;
transmitting, by the HDC-FE, received shared key material D to a layer-3 handover execution module;
protecting security of the layer-3 mobility user plane data by the terminal and the layer-3 handover execution module by using received shared key material D.

2. A system for protecting security of layer-3 mobility user plane data in Next Generation Network (NGN), comprising: a terminal, an authentication server, a Mobile Location Management Functional Entity (MLM-FE), a Handover Decision and Control Functional Entity (HDC-FE), and a layer-3 handover execution module, wherein

- the terminal is configured to perform authentication to the authentication server and obtain a shared key material A after the authentication is passed;
- to interact with the authentication server, the MLM-FE and the HDC-FE to obtain layer-3 mobility information, wherein the layer-3 mobility information includes: address of destination network and type of destination network;
- to generate shared key material C for protecting security of layer-3 mobility signaling plane according to the layer-3 mobility information and shared key material A;
- to interact a mobility signaling with the MLM-FE, wherein the security of the mobility signaling is protected by shared key material C;
- to generate shared key material D for protecting security of layer-3 mobility user plane according to the layer-3 mobility information and shared key material A;
- to protect security of the layer-3 mobility user plane data between the terminal and the layer-3 handover execution module by using shared key material D;
- the authentication server is configured to perform authentication to the terminal and obtain a shared key material A after the authentication is passed, and to generate shared key material C for protecting security of layer-3 mobility signaling plane according to the layer-3 mobility information and shared key material A and transmit generated shared key material C to the MLM-FE;
- the MLM-FE is configured to interact a mobility signaling with the terminal, wherein the security of the mobility signaling is protected by shared key material C; and to generate shared key material D for protecting security of layer-3 mobility user plane according to the layer-3 mobility information and shared key material A; and to transmit generated shared key material D to the HDC-FE;
- the HDC-FE is configured to transmit received shared key material D to the layer-3 handover execution module;
- the layer-3 handover execution module is configured to protect security of the layer-3 mobility user plane data between the terminal and the mobility data transmission module by using received shared key material D;
- wherein the terminal, the authentication server, the MLM-FE, the HDC-FE, and the layer-3 handover execution module are each the result of execution on a processor of software stored in a memory.

* * * * *